United States Patent
Wickeraad

(10) Patent No.: US 10,764,182 B2
(45) Date of Patent: Sep. 1, 2020

(54) COMBINING PREFIX LENGTHS INTO A HASH TABLE

(71) Applicant: Hewlett Packard Enterprise Development LP, Houston, TX (US)

(72) Inventor: John A. Wickeraad, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 12 days.

(21) Appl. No.: 15/745,445

(22) PCT Filed: Jul. 17, 2015

(86) PCT No.: PCT/US2015/040934
§ 371 (c)(1),
(2) Date: Jan. 17, 2018

(87) PCT Pub. No.: WO2017/014724
PCT Pub. Date: Jan. 26, 2017

(65) Prior Publication Data
US 2018/0212877 A1    Jul. 26, 2018

(51) Int. Cl.
*H04L 12/745* (2013.01)
*H04L 12/743* (2013.01)
*H04L 29/12* (2006.01)

(52) U.S. Cl.
CPC ........ *H04L 45/748* (2013.01); *H04L 45/7453* (2013.01); *H04L 45/7457* (2013.01); *H04L 61/6004* (2013.01)

(58) Field of Classification Search
None
See application file for complete search history.

(56) References Cited

U.S. PATENT DOCUMENTS

| | | | | |
|---|---|---|---|---|
| 6,011,795 A | * | 1/2000 | Varghese | H04L 29/12132 370/392 |
| 6,052,683 A | * | 4/2000 | Irwin | H04L 45/7457 707/758 |
| 6,212,184 B1 | * | 4/2001 | Venkatachary | H04L 45/00 370/238 |
| 6,691,171 B1 | * | 2/2004 | Liao | H04L 45/00 709/245 |
| 7,398,278 B2 | | 7/2008 | Cadambi et al. | |
| 7,885,268 B2 | | 2/2011 | Pong | |

(Continued)

FOREIGN PATENT DOCUMENTS

WO    WO-2010/145295 A1    12/2010

OTHER PUBLICATIONS

Srinivasan V et al: "Fast address lookups using controlled prefix expansion", ACM Transactions on Computer Systems (TOGS), Association for Computing Machinery, Inc, US, pp. 1-40.

(Continued)

*Primary Examiner* — Jamaal Henson
(74) *Attorney, Agent, or Firm* — Hewlett Packard Enterprise Patent Department

(57) ABSTRACT

Examples herein disclose a smaller prefix length and a greater prefix length which are identified from a routing table of various prefix lengths. The smaller prefix length is converted into the greater prefix length. The converted prefix length and the greater prefix length are combined into a hash table.

12 Claims, 6 Drawing Sheets

(56) References Cited

U.S. PATENT DOCUMENTS

| | | | |
|---|---|---|---|
| 8,938,469 B1* | 1/2015 | Keen | H04L 45/7453 |
| | | | 707/747 |
| 9,268,967 B2* | 2/2016 | Youd | G06F 21/64 |
| 2004/0141509 A1* | 7/2004 | Sahni | H04L 45/748 |
| | | | 370/401 |
| 2005/0141519 A1* | 6/2005 | Rajgopal | H04L 45/00 |
| | | | 370/395.32 |
| 2006/0198379 A1 | 9/2006 | Cadambi et al. | |
| 2006/0200581 A1* | 9/2006 | Cadambi | H04L 61/6004 |
| | | | 709/245 |
| 2007/0136331 A1* | 6/2007 | Hasan | G06F 16/9014 |
| 2008/0112413 A1* | 5/2008 | Pong | H04L 45/00 |
| | | | 370/392 |
| 2010/0023727 A1* | 1/2010 | Lim | H04L 45/00 |
| | | | 711/216 |
| 2010/0257181 A1 | 10/2010 | Zhou et al. | |
| 2011/0170531 A1 | 7/2011 | Ng et al. | |
| 2012/0257506 A1* | 10/2012 | Bazlamacci | H04L 45/00 |
| | | | 370/235 |
| 2015/0098470 A1 | 4/2015 | Sun et al. | |

OTHER PUBLICATIONS

Adam Kirsch et al., "Hash-based Techniques for High-speed Packet Processing," Aug. 19, 2008, pp. 1-40.

International Searching Authority, The International Search Report and the Written Opinion, dated Apr. 14, 2016, PCT/US2015/040934, 11 Pgs.

Sarang Dharmapurikar et al., "Longest Prefix Matching Using Bloom Filters," SIGCOMM'03, Aug. 25-29, 2003, Karlsruhe, Germany, 2003, pp. 1-12, ACM.

* cited by examiner

COMBINING PREFIX LENGTHS INTO A HASH TABLE

BACKGROUND

A routing table is a data table on a networking device which lists the routes and appropriate destinations for a data packet. The networking device uses the routing table to perform an address prefix lookup operation to determine the next appropriate destination.

BRIEF DESCRIPTION OF THE DRAWINGS

In the accompanying drawings, like numerals refer to like components or blocks. The following detailed description references the drawings, wherein.

DETAILED DESCRIPTION

Figure 1:
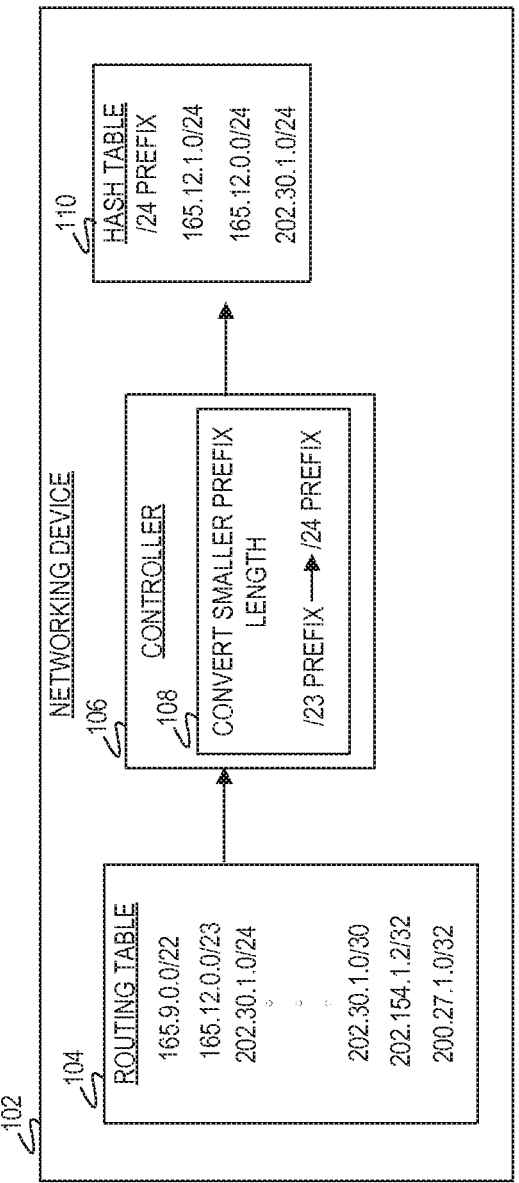
FIG. 1 is a block diagram of an example networking device to build a hash table by converting a smaller prefix length from a routing table into a greater prefix length in accordance with the present disclosure.

The growth of the Internet has led to an increased demand for a networking device to efficiently perform an Internet Protocol (IP) address prefix lookup. The networking device references a routing table to decide the next hop for each data packet. As such, the routing table incudes various prefix lengths corresponding to different destination subnets. These routing tables have grown in size to accommodate the various prefix lengths and routing destinations.

The routing table such as a best match prefix (BMP), also known as longest prefix match (LPM) routing table may include few address entries at particular prefix lengths. A hash table may be implemented to dedicate to each prefix length; however this may not make good use of resources. A ternary content addressable memory (TCAM) can be used to hold the prefix lengths of few entries; however placing the prefix lengths in the TCAM may take much power and memory. For example, for each cell of data the TCAM would store the full prefix including the full routing address and masking bits to mask the proper prefix length for lookup operations. Using the additional masking bits may increase the additional amount of memory for the TCAM to store an entry. Additionally, the search operation performed within the TCAM results in increased power as each entry is compared to locate the appropriate entry.

To address the above-referenced issues, some examples provide a mechanism to optimize a routing table and/or hash table. The examples break up a large routing table into smaller hash tables of varying lengths. The examples reference the routing table to identify a smaller prefix length and a greater prefix length. The smaller prefix length is converted into a length of bits equivalent to the greater prefix length. Converting the smaller prefix length allows the combination between the converted prefix length and the greater prefix length into a single hash table of a unified prefix length. Creating the single hash table of unified prefix length produces fewer hash tables used to implement the routing table and reduces the amount of prefix lengths in the routing table. This allows the networking device to perform more efficient lookup operations.

In another example, the smaller prefix length is converted by extending the smaller prefix length into the number of bits equivalent to the greater prefix length. Extending the smaller prefix length enables the smaller prefix to fit the greater fix length to provide the unified hash table.

The unified hash table may be placed in a random access memory (RAM) as opposed to the TCAM which would takes more space for the additional functional bits per cell. The unified hash table may be placed in a random access memory (RAM) as opposed to the TCAM which would takes more space for the additional functional bits per cell. For example, the TCAM is a type of memory which consists of a bit comparator and two memory elements, one memory element for storing data and the other memory element for storing the compare mask. Storing the hash table in the TCAM increase the memory space, thus placing the hash table in RAM saves power and memory as RAM uses less power than the TCAM.

Thus some of the examples disclosed herein optimizes a number of address entries in a hash table. The examples break up a large routing table which takes much power and memory into smaller hash tables of specific lengths.

FIG. 1 is a block diagram of an example networking device 102 to build a hash table 110 of unified prefix length. The networking device 102 includes a controller 106 to use a routing table 104 for identifying a smaller prefix length and a greater prefix length. The controller 106 converts the smaller prefix length at module 108 to build the hash table 110. FIG. 1 illustrates a networking system in which networked computing devices, such as the networking device 102 may exchange data in the fours of data packets. These networked computing devices establish data connections in the form on networking links to route and/or forward the data packets. As such, implementations of the networking system include, by way of example, a telecommunications network, Internet, Ethernet, wide area network (WAN), local area network (LAN), optic cable network, virtual network or other type of networking system to route data packets, accordingly.

The networking device 102 is a networking component that receives incoming data packets and performs a lookup operations to route the incoming data packets to the appropriate destinations. Implementations of the networking device 102 include, by way of example, a networking switch, router, virtual networking component, or other type of networking device 102 which routes data packets to the appropriate destinations.

The routing table 104 is a data table obtained by the networking device 102 that specifies a route to particular network destinations. As such, the networking device 102 references the routing table to perform an Internet Protocol (IP) address lookup to determine the destination address of an incoming data packet. The routing table 104 includes various prefix lengths (e.g., /22, /23, /24, /30, /32). The various prefix lengths correspond to each destination subnet so the networking device 102 may determine the next hop for the data packets. The prefix lengths represent the number of bits set in a subnet mask. For example, if the subnet mask is 255.255255.0, there are 24 1's in the binary version, so the prefix length is 24 bits.

Referencing the routing table 104, the controller 106 identifies the smaller prefix length and the greater prefix length. The smaller prefix length includes the number of bits less than the greater prefix length. The greater prefix length provides the guidance on the unified prefix length of the hash table 110. The smaller prefix length and the greater prefix length may be identified by determining which prefix lengths are adjacent to each other in the routing table 104. For example, a prefix length of /23 is adjacent to the prefix length of /24 within the routing table 104.

The controller 106 converts the smaller prefix length into a number of bits equivalent to the greater prefix length at module 108. For example as illustrated in FIG. 1, the /23 prefix length may be converted into a /24 prefix length by extending the prefix lengths by a number of bits to achieve an equivalent length. Converting the smaller prefix length enables the greater prefix length and the converted smaller prefix length to be combined into the hash table 110 to provide the unified prefix length. Implementations of converting the smaller prefix length into the greater prefix length may be explained in detail in the next figure. The module 108 may include, by way of example, instructions (e.g., stored on a machine-readable medium) that, when executed (e.g., by the controller 106) implement the functionality of module 108. Alternatively, or in addition, the module 108 may include electronic circuitry (i.e., hardware) that implements the functionality of module 108. The controller 106 may include, by way of example, a microcontroller, integrated circuit, processing device, semiconductor, circuit, or other type of hardware component for converting the smaller prefix length into the greater prefix length.

The hash table 110 is a data structure in which the controller may perform the lookup operation to determine an IP address of where to route the incoming packet(s). The hash table 110 includes prefix lengths and the corresponding addresses from the converted smaller prefix length and the identified greater prefix length. Combining both the converted smaller prefix length and the identified greater prefix length provides a unified prefix length. For example, the hash table 110 includes the unified count of /24 prefix length. As such, the /23 prefix length may be converted to the /24 prefix length for placement in the hash table 110.

Figures 2A, 2B:
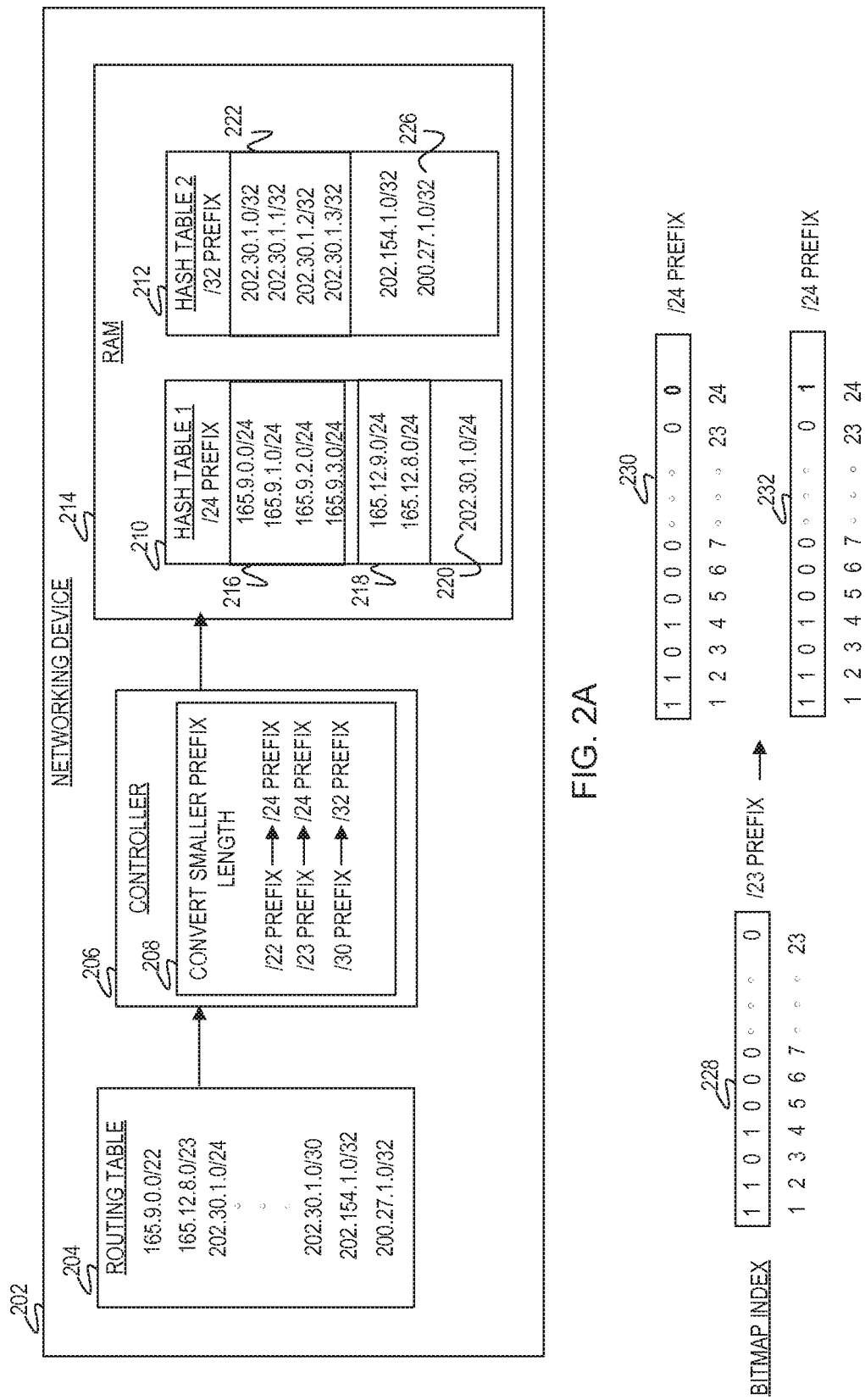
FIG. 2A is an example networking device to build multiple hash tables by converting smaller prefix lengths identified from a routing table into greater prefix lengths as in accordance with the present disclosure.
FIG. 2B is a data table of an example index of bitmap values to convert a smaller prefix length into a greater prefix length in accordance with the present disclosure.

FIGS. 2A-2B illustrate an example networking device and a prefix data representation of a converted smaller prefix length. Not all of the depicted components may be required, however, implementations may include additional components not shown in the figures. Variations in the arrangement and type of the components may be made without departing from the scope of the claims as set forth herein.

FIG. 2A is an example networking device 202 to build multiple hash tables 210 and 212. The hash tables 210 and 212 are each of a different unified prefix length. For example, the hash table 210 includes the /24 unified prefix length while the hash table 212 includes the /32 unified prefix length. The hash tables 210 and 212 are created by a controller 206 identifying smaller prefix lengths and greater prefix lengths from a routing table 204. The controller 206 converts the smaller prefix lengths at module 208 into an equivalent number of bits as the greater prefix lengths. Upon converting the smaller prefix lengths, the controller 206 combines the converted smaller prefix lengths with the identified greater prefix lengths to create the respective hash tables 210 and 212. These hash tables 210 and 212 and placed in RAM 214.

The controller 206 converts the smaller prefix lengths into a length of bits equivalent to the identified greater prefix lengths. For example, the /22 and /23 are converted into the /24 prefix length, while the /30 prefix length is converted into the /32 prefix length. The smaller prefix length(s) are identified as being those prefix lengths smaller (e.g., smaller number of set bits in an address) than the greater prefix lengths. In one implementation, the greater prefix lengths are initially identified, while the smaller prefix lengths are those lengths adjacent to the greater prefix lengths. For example, the greater prefix length in the routing table 104 includes the /24 prefix length while the smaller prefix lengths includes the /22 and /23 prefix lengths. In FIG. 2A, the controller 206 converts the /22 and /23 prefix lengths into the /24 prefix length while the controller 206 also converts the /30 prefix length into the /32 prefix lengths. Converting the smaller prefix lengths includes adding the number of bits to make the length of the smaller prefix adjacent to the length of the greater prefix. This is illustrated in FIG. 2A.

The hash table 210 includes the converted smaller prefix lengths 216 and 218 and the identified greater prefix length 220. In the example of hash table 210, the identified greater prefix length includes a /24 count, thus the smaller prefix lengths of /22 and /23 are converted into a number of bits equivalent to the /24 count. These lengths and corresponding address entries are combined into the hash table 210 to create the unified prefix length of /24. The converted prefix length 216 represents the situation of where the original /22 smaller prefix length is converted into the /24 greater prefix length. The converted prefix length 218 represents the original /23 smaller prefix length as converted into the /24 greater prefix length. The greater prefix length 220 is not converted from the routing table 204 prior to placement in the hash table 210.

The hash table 212 includes the converted smaller prefix length 222 and the identified greater prefix length 226. In the example of hash table 212, the identified greater prefix length includes the /32 count, thus the smaller prefix lengths as from the routing table 204 include the /30 prefix length. This smaller prefix length (/30) is converted into the number of bits equivalent to the /32 count. These converted lengths and corresponding address entries are combined into the hash table 212 to create the unified prefix length of /32. The converted prefix length 222 represents the original /30 smaller prefix length which is converted into the /32 greater prefix length. The greater prefix length 226 is not converted from the routing table 204 prior to placement into the hash table 212.

FIG. 2B is database representing an example bitmap index of values corresponding to a smaller prefix length 228. The smaller prefix length 228 is converted into a greater prefix length by extending the index value by a bit to achieve a number of bits equivalent to the greater prefix length. The equivalent number of bits to the greater prefix length is achieved by converting the smaller prefix lengths 230 and 232. The conversion of the smaller prefix lengths 230 and 232 are produced by extending the bits with a binary value representing two conditions. For example, the smaller prefix length of /23 is converted into the greater prefix length of /24. The networking device 202 adds the bit of 0 or 1 in the index place value of /24. The converted smaller prefix lengths 230 and 232 are added with the greater prefix length of /24 to build the unified hash table of /24 prefix length. Increasing the number of bits also increases the number of states or combinations of the converted prefix length. In this example, by adding the single bit of 0 or 1, represents two different states of the converted prefix length. Thus, adding two bits of 00, 01, 10, and 01 represents the four different combinations of the converted smaller prefix length.

Figure 3:
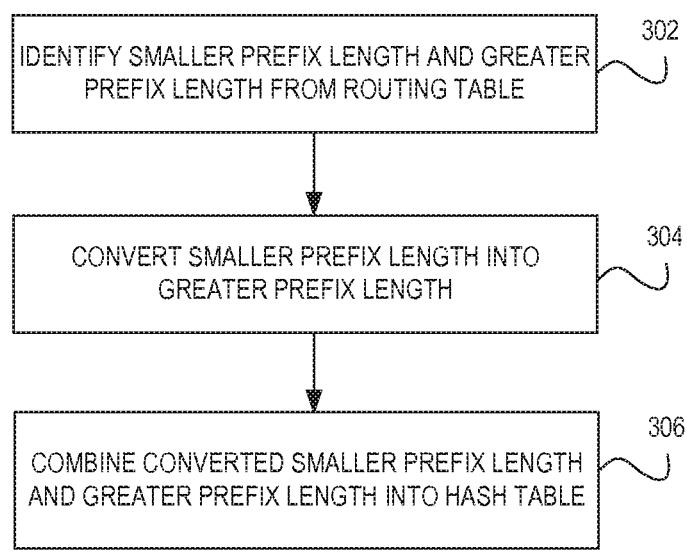
FIG. 3 is a flowchart of an example method to combine a converted smaller prefix length and a greater prefix length into a hash table in accordance with the present disclosure.
Figure 4:
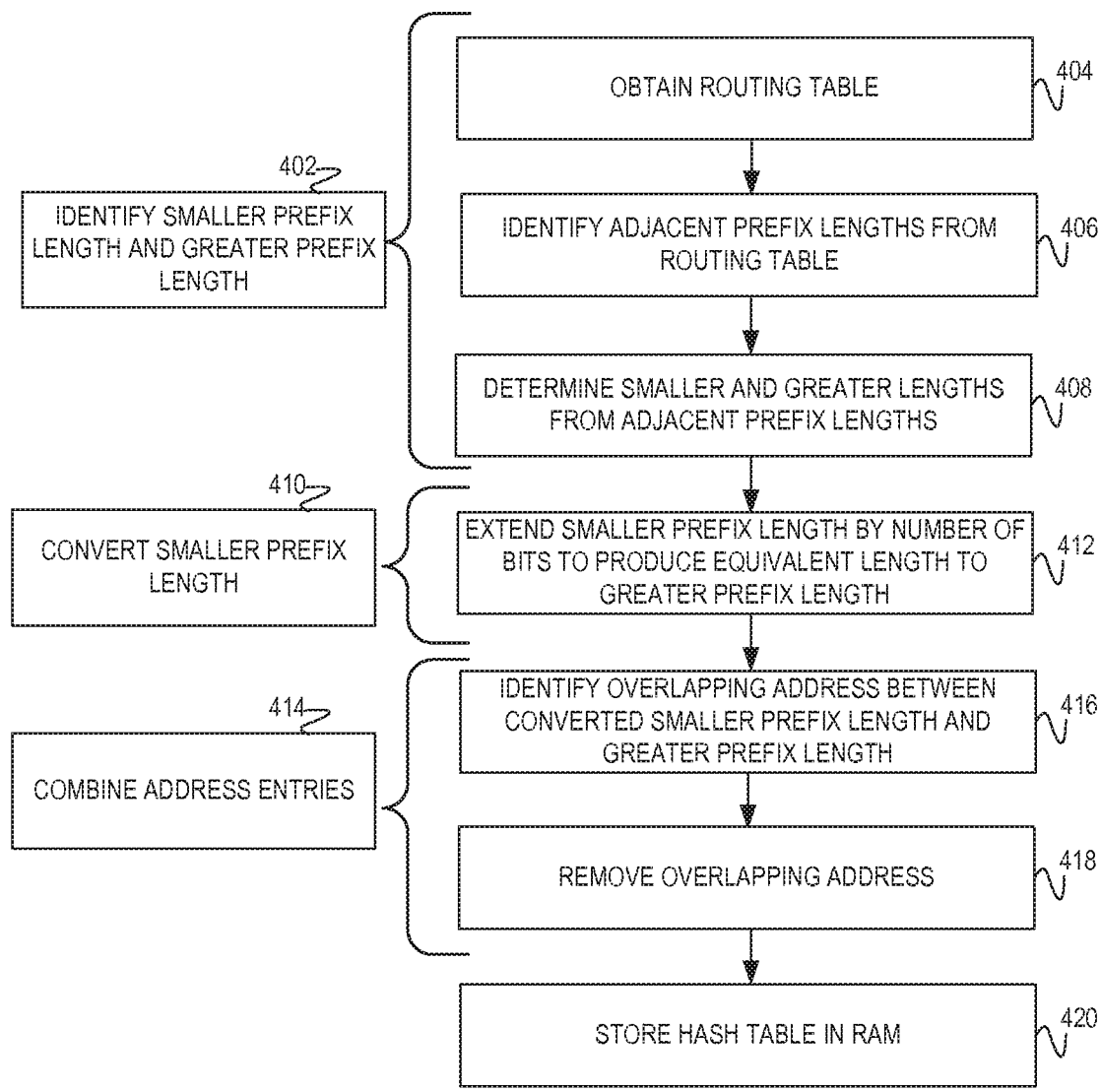
FIG. 4 is a flowchart of an example method to build a hash table for storage in a random access memory (RAM) as in accordance with the present disclosure.

Referring now to FIGS. 3 and 4, flowcharts are illustrated in accordance with various examples of the present disclosure. The flowcharts represent processes that may be utilized in conjunction with various systems and devices as discussed with reference to the preceding figures. While illustrated in a particular order, the flowcharts are not intended to be so limited. Rather, it is expressly contemplated that various processes may occur in different orders and/or simultaneously with other processes than those illustrated.

FIG. 3 illustrates a flowchart of an example method to optimize a hash table by combining a converted smaller prefix length and a greater prefix length together. A networking device receives a routing table of various prefix lengths. Using this routing table, the networking device identifies a smaller prefix length and a greater prefix length. The smaller prefix length is converted into an equivalent amount of bits as the greater prefix length. The converted smaller prefix length and the identified prefix length are combined into the hash table. Converting the smaller prefix length creates uniformity in which the smaller prefix length has the equivalent amount of bits to the identified greater prefix length. In discussing FIG. 3, references may be made to the components in FIGS. 1-2B to provide contextual examples. In one implementation, the networking device 102 executes operations 302-306 build the hash table. Although FIG. 3 is described as implemented by the networking device 102, it may be executed on other suitable components. For example, FIG. 3 may be implemented in the form of executable instructions on a machine-readable storage medium 504 and 604 as in FIGS. 5-6.

At operation 302, the networking device identifies the smaller prefix length and the greater prefix length from the routing table. The routing table is used by the networking device to perform lookup function in which to determine a location (e.g., next hop information) for routing incoming data packets. The routing table may be obtained from a nearby server listing the various address prefix lengths. The various prefix lengths represent a number of bits to designate an Internet Protocol (IP) address. The IP address is a 32 bit value; as such the routing table entry with a prefix length represents a set of IP address that matches the upper portion of the prefix length. As such, the routing table may include an abundant amount of specific prefix lengths. Accordingly, a lookup operation may become more efficient if particular prefix addresses were separated out from the routing table into the hash table. Identifying the smaller prefix length and the greater prefix length from the routing table enables the networking device to separate these address lengths to build the hash table. The networking device may initially identify the greater prefix length to determine which prefix lengths may be less than the greater prefix length for identification of the smaller prefix length.

The smaller prefix length represents a smaller number of bits in an address compared to the greater prefix length. In one implementation, the smaller prefix length is a lesser number of bits than the greater prefix length. For example, the smaller prefix length of /<16 (less than 16 bits) may be combined into the greater prefix length of /16. In other implementations, the smaller prefix length may be an adjacent prefix length to the greater prefix length in the routing table. For example, a smaller prefix length of /15 may be combined with a greater prefix length of /16.

At operation 304, the networking device converts the smaller prefix length into the greater prefix length. The networking device converts the smaller prefix length into a length of bits equivalent to the greater prefix length. Converting the prefix length, provides a unified prefix length to combine both identified prefix lengths together into the hash table. Additionally, this conversion allows entries of different prefix lengths to be combined into the same hash table.

At operation 306, the networking device combines both the converted smaller prefix length and the greater prefix length identified at operation 302 into the hash table. Combining the converted smaller prefix length and the greater prefix length includes combining the corresponding address entries from the routing table into the hash table.

FIG. 4 is a flowchart of an example method, executable by a networking device, to combine a converted smaller prefix length and a greater prefix length into a unified prefix length hash table. The networking device converts the smaller prefix length by extending the smaller prefix length by a number of bits to produce an equivalent prefix length to the greater prefix length. Upon converting the smaller prefix length, the networking device identifies an overlapping address entry for removal. Upon removing the overlapping address entry, the networking device places the hash table in RAM. In discussing FIG. 4, references may be made to the components in FIGS. 1-2B to provide contextual examples. In one implementation, the networking device 102 executes operations 402-420 to build the hash table. Although FIG. 4 is described as implemented by the networking device 102, it may be executed on other suitable components. For example, FIG. 4 may be implemented in the form of executable instructions on a machine-readable storage medium 504 and 604 as in FIGS. 5-6.

At operation 402, the networking device identifies the smaller prefix length and the greater prefix length from the routing table. As such, the networking device may proceed to operations 404-408 to identify the prefix lengths.

At operations 404-408, the networking device identifies adjacent prefix lengths from the routing table. The adjacent prefix lengths include the smaller prefix length and the greater prefix length. The greater prefix length represents the unified prefix length in which to create the hash table. The smaller prefix length is the length(s) which may be converted to obtain the unified prefix length.

At operation 410, the networking device converts the smaller prefix length into the greater prefix length. The networking device may extend the smaller prefix length by a number of bits to produce a bit length equivalent to the greater prefix length as at operation 412.

At operation 412, the networking device extends the smaller prefix length by the bit(s). The networking device adds the bit(s) to extend the smaller prefix length to fit the hash table of the greater prefix length. The extender bit(s) represent the different conditions of the smaller prefix length. As such, each condition of the smaller prefix length is captured to include as part of the hash table. For example, if a single bit is added (0 or 1) this represents two different conditions. Thus, both of these conditions are represented for combination in the hash table. In another example, if two bits are added (00, 01, 10, or 11), this represents four different conditions or combinations of the extender bits. As such, each of the four conditions are added to the smaller prefix length to produce four different combinations of the smaller prefix length.

At operation 414, the networking device combines the address entries corresponding to the converted prefix length and the greater prefix length to build the hash table. Combining the address entries, provides the hash table of the unified prefix length.

At operations 416-418, the networking device identities the overlapping address between the converted smaller prefix length and the greater prefix length for removal. Upon extending the smaller prefix length by the number of bits, one of the extended smaller prefix length addresses may overlap with one of the greater prefix length addresses. As such, including multiple address may make the routing destinations incorrect. In this implementation, there may be a correct overlapping address entry to keep and another overlapping address entry to remove. The duplicate address entry after combining the prefix lengths are resolved by keeping the address entry that was originally the longer prefix. The original longer prefix is that address entry which was identified in connection with the greater prefix length from the routing table. Thus, the networking device compares the extended smaller prefix length addresses to the greater prefix length address to identify those address entries which may be repetitive. As such, the networking device proceeds to remove these repetitive or overlapping address from the hash table.

At operation 420, the unified prefix length hash table is stored in RAM. Storing the hash table in RAM enables the networking device to readily perform the lookup operations on the hash table.

Figure 5:
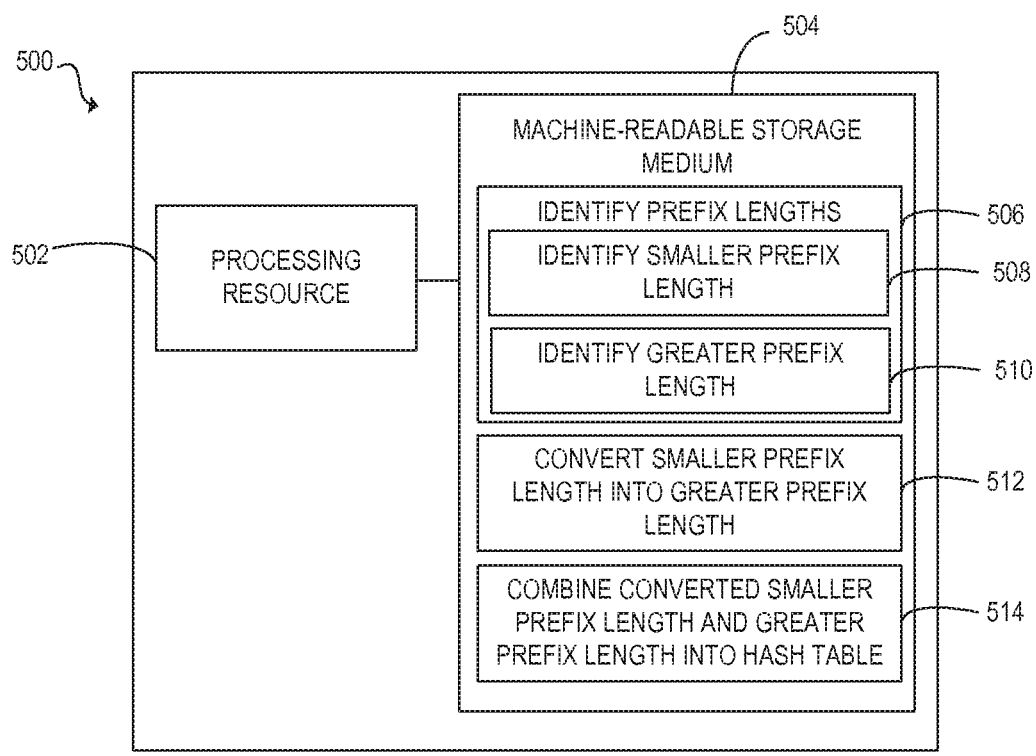
FIG. 5 is a block diagram of an example computing device with a processing resource to execute instructions in a machine-readable storage medium building a hash table in accordance with the present disclosure.

FIG. 5 is a block diagram of computing device 500 with a processing resource 502 to execute instructions 506-514 within a machine-readable storage medium 504. Specifically, the computing device 500 with the processing resource 502 is to convert a smaller prefix length for combining with a greater prefix length into a hash table. Although the computing device 500 includes processing resource 502 and machine-readable storage medium 504, it may also include other components that would be suitable to one skilled in the art. For example, the computing device 500 may include the controller 106 as in FIG. 1. The computing device 500 is an electronic device with the processing resource 502 capable of executing instructions 506-514, and as such embodiments of the computing device 500 include a mobile device, client device, personal computer, desktop computer, laptop, tablet, video game console, or other type of electronic device capable of executing instructions 506-514. The instructions 506-514 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-514 to combine the converted smaller prefix length and the greater prefix length into the hash table for optimization. Specifically, the processing resource 502 executes instructions 506-514 to: identify the smaller prefix length and the greater prefix length from a routing table; convert the smaller prefix length into a number of bits equivalent to the greater prefix length; and combine the converted smaller prefix length and the identified greater prefix length into the hash table together.

The machine-readable storage medium 504 includes instructions 506-514 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the computing device 500.

Figure 6:
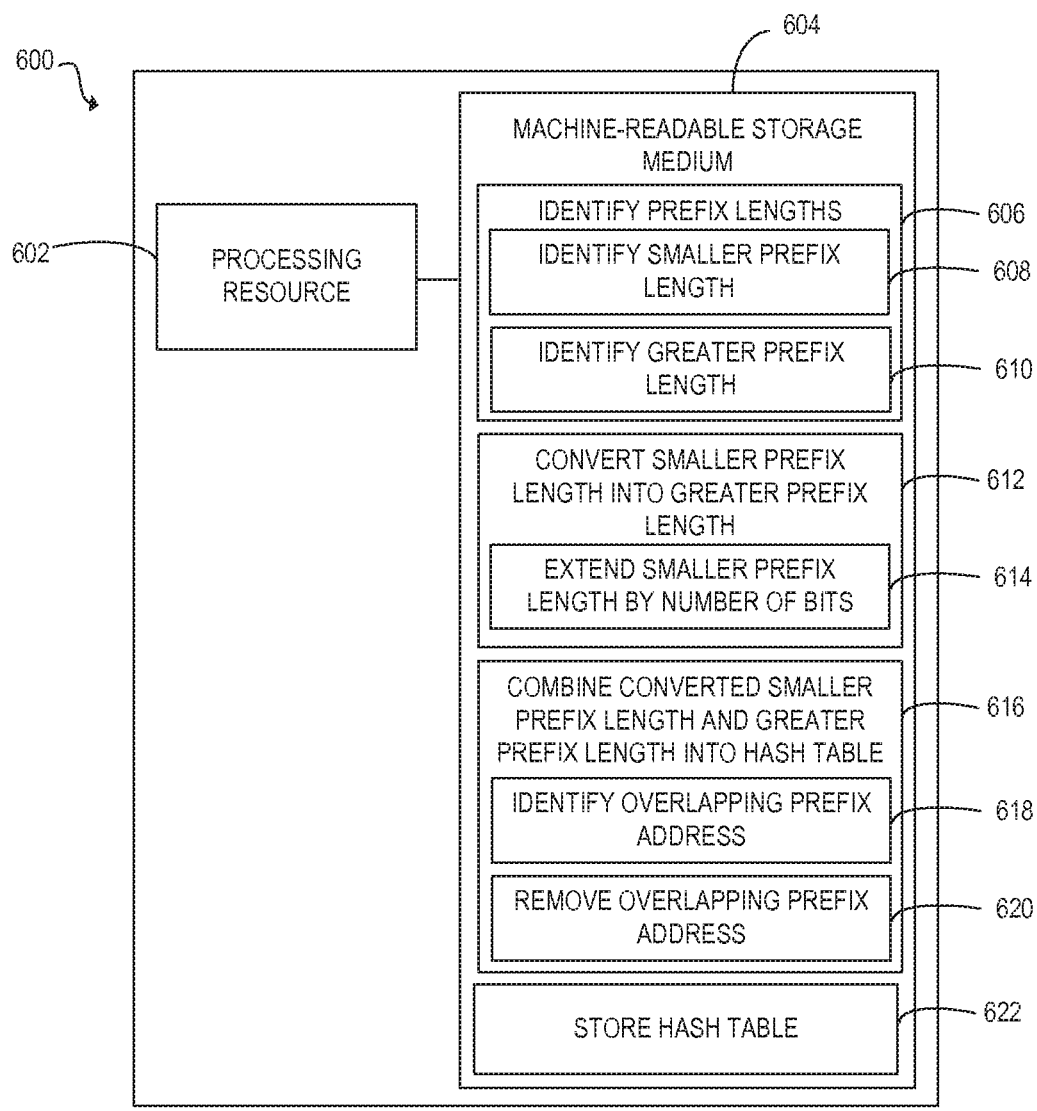
FIG. 6 is a block diagram of an example computing device with a processing resource to execute instructions in a machine-readable storage medium for building a hash table in accordance with the present disclosure.

FIG. 6 is a block diagram of computing device 600 with a processing resource 602 to execute instructions 606-622 within a machine-readable storage medium 604. Specifically, the computing device 600 with the processing resource 602 extends a smaller prefix length and combines the extended smaller prefix length with a greater prefix length into a hash table. The extended smaller prefix length and the greater prefix length are processed to remove an overlapping entry address. Upon removal of the overlapping entry address, the hash table is stored in RAM. Although the computing device 600 includes processing resource 602 and machine-readable storage medium 604, it may also include other components that would be suitable to one skilled in the art. For example, the computing device 600 may include the controller 106 as in FIG. 1. The computing device 600 is an electronic device with the processing resource 602 capable of executing instructions 606-622, and as such embodiments of the computing device 600 include a mobile device, client device, personal computer, desktop computer, laptop, tablet, video game console, or other type of electronic device capable of executing instructions 606-622. The instructions 606-622 may be implemented as methods, functions, operations, and other processes implemented machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-622 to convert the smaller prefix length through extension of a bit. The converted smaller prefix length is compared against the greater prefix length to identify the overlapping address entry for removal. Upon removing the overlapping address entry, the converted prefix length and the greater prefix length are combined into the hash table for storage within the RAM. Specifically, the processing resource 602 executes instructions 606-622 to: identify a smaller prefix length and a greater prefix length from the routing table of various prefix lengths; the identified smaller prefix length is converted by extending a bit to achieve an equivalent number of bits to the identified greater prefix length; the converted smaller prefix length and the greater prefix length are compared to each other to identify an overlapping address entry; upon identification of the overlapping address entry, the overlapping address is removed; the converted smaller prefix length and the greater prefix length are combined into the hash table sans the overlapping address entry; upon the combination of the hash table, the hash table is placed in the RAM for storage.

The machine-readable storage medium 604 includes instructions 606-622 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A non-transitory machine-readable storage medium comprising instructions that when executed by a processing resource cause a networking device to:
    obtain a routing table of various prefix lengths;
    divide the routing table into a plurality of prefix-length-specific hash tables, wherein dividing the routing table comprises:
        identifying a set of greater prefix lengths from the routing table;
        for a respective greater prefix length, identifying, from the routing table, at least one smaller prefix length that is smaller than the respective greater prefix length;
        converting the smaller prefix length into the greater prefix length;
        constructing, for each greater prefix length in the set of greater prefix lengths, a prefix-length-specific hash table, wherein constructing a corresponding prefix-length-specific hash table for the respective greater prefix length comprises combining address entries corresponding to the converted smaller prefix length and address entries corresponding to the respective greater prefix length into a single hash table;
        examining a constructed prefix-length-specific hash table to identify duplicated address entries in the constructed prefix-length-specific hash table; and
        removing a duplicated address entry corresponding to a converted smaller prefix length from the constructed prefix-length-specific hash table; and
    perform address lookup of an incoming packet based at least on the plurality of prefix-length-specific hash tables.

2. The non-transitory machine-readable storage medium of claim 1, wherein converting the smaller prefix length into the respective greater prefix length comprises instructions that when executed by the processing resource causes the networking device to:
    extend the smaller prefix length by a number of bits to produce a length of bits equivalent to the respective greater prefix length.

3. The non-transitory machine-readable storage medium of claim 1, wherein the smaller prefix length and the respective greater prefix length include lengths that are adjacent to each other.

4. The non-transitory machine-readable storage medium of claim 1, comprising instructions that when executed by the processing resource causes the networking device to:
    store the plurality of prefix-length-specific hash tables in a random access memory (RAM) of the networking device.

5. The non-transitory machine-readable storage medium of claim 1, wherein converting the smaller prefix length into the respective greater prefix length comprises instructions that when executed by the processing resource causes the networking device to:
    extend the smaller prefix length by a bit to produce the respective greater prefix length.

6. A method, executable by a networking device, the method comprising:
    obtaining a routing table of various prefix lengths;
    dividing the routing table into a plurality of prefix-length-specific hash tables, wherein dividing the routing table comprises:
        identifying a set of greater prefix lengths from the routing table;
        for a respective greater prefix length, identifying, from the routing table, at least one smaller prefix length that is smaller than the respective greater prefix length;
        converting the smaller prefix length into the respective greater prefix length;
        constructing, for each greater prefix length in the set of greater prefix lengths, a prefix-length-specific hash table, wherein constructing a corresponding prefix-length-specific hash table for the respective greater prefix length comprises combining address entries corresponding to the converted smaller prefix length and address entries corresponding to the respective greater prefix length into a single hash table;
        examining a constructed prefix-length-specific hash table to identify duplicated address entries in the constructed prefix-length-specific hash table; and
        removing a duplicated address entry corresponding to a converted smaller prefix length from the constructed prefix-length-specific hash table; and
    performing address lookup of an incoming packet based at least on the plurality of prefix-length-specific hash tables.

7. The method of claim 6, wherein converting the smaller prefix length into the respective greater prefix length comprises:
    extending the smaller prefix length by a number of bits to produce a length equivalent to the respective greater prefix length.

8. The method of claim 6, wherein identifying the respective greater prefix from the routing table of various prefix lengths comprises:
    obtaining the routing table;

identifying adjacent prefix lengths from the routing table; and identifying from the adjacent prefix lengths a prefix length having a greater prefix.

9. The method of claim 6, comprising:

storing the plurality of prefix-length-specific hash tables in a random access memory (RAM) of the networking device.

10. A networking device comprising:

a routing table of various prefix lengths;

a networking controller to:
- divide the routing table into a plurality of prefix-length-specific hash tables, wherein dividing the routing table comprises:
  - identifying a set of greater prefix lengths from the routing table;
  - for a respective greater prefix length, identifying, from the routing table, at least one smaller prefix length that is smaller than the respective greater prefix length;
  - converting the smaller prefix length into the respective greater prefix length;
  - constructing, for each greater prefix length in the set of greater prefix lengths, a prefix-length-specific hash table, wherein constructing a corresponding prefix-length-specific hash table for the respective greater prefix length comprises combining address entries corresponding to the converted smaller prefix length and address entries corresponding to the respective greater prefix length from the routing table into a single hash table;
  - examining a constructed prefix-length-specific hash table to identify duplicated address entries in the constructed prefix-length-specific hash table; and
  - removing a duplicated address entry corresponding to a converted smaller prefix length from the constructed prefix-length-specific hash table; and
- perform address lookup of an incoming packet based at least on the plurality of prefix-length-specific hash tables.

11. The networking device of claim 10, comprising:

the plurality of prefix-length-specific hash tables; and a random access memory (RAM) to store the plurality of prefix-length-specific hash tables.

12. The networking device of claim 10, wherein converting the smaller prefix length into the respective greater prefix length the networking controller is to:

extend the smaller prefix length by a bit to produce the respective greater prefix length.

\* \* \* \* \*